United States Patent
Li et al.

(10) Patent No.: US 9,137,259 B2
(45) Date of Patent: Sep. 15, 2015

(54) SWITCH ROUTE EXPLORING METHOD, SYSTEM AND DEVICE

(75) Inventors: Qin Li, Shaanxi (CN); Jun Cao, Shaanxi (CN); Manxia Tie, Shaanxi (CN); Zhenhai Huang, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 74 days.

(21) Appl. No.: 13/702,785

(22) PCT Filed: Jan. 14, 2011

(86) PCT No.: PCT/CN2011/070246
§ 371 (c)(1),
(2), (4) Date: Dec. 7, 2012

(87) PCT Pub. No.: WO2011/153832
PCT Pub. Date: Dec. 15, 2011

(65) Prior Publication Data
US 2014/0007231 A1    Jan. 2, 2014

(30) Foreign Application Priority Data
Jun. 7, 2010    (CN) .......................... 2010 1 0195725

(51) Int. Cl.
*H04L 29/06* (2006.01)
*H04L 12/721* (2013.01)

(52) U.S. Cl.
CPC ............ *H04L 63/1475* (2013.01); *H04L 45/26* (2013.01)

(58) Field of Classification Search
CPC ............................ H04L 63/1475; H04L 45/26
USPC .............................................................. 726/22
See application file for complete search history.

(56) References Cited

U.S. PATENT DOCUMENTS

| 7,782,835 | B2 | 8/2010 | Gossain et al. |
| 2004/0081175 | A1* | 4/2004 | Wall et al. ...................... 370/397 |
| 2005/0030921 | A1* | 2/2005 | Yau .............................. 370/329 |
| 2007/0002821 | A1* | 1/2007 | Carlson et al. ................ 370/349 |
| 2007/0165592 | A1* | 7/2007 | Gossain et al. ............... 370/349 |

(Continued)

FOREIGN PATENT DOCUMENTS

| CN | 1599357 A | 3/2005 |
| CN | 1833414 A | 9/2006 |

(Continued)

OTHER PUBLICATIONS (See screen shot of STIC NPL search).*

(Continued)

*Primary Examiner* — Matthew Smithers
(74) *Attorney, Agent, or Firm* — Harness, Dickey & Pierce, P.L.C.

(57) ABSTRACT

A switch route exploring method, system and device are provided in the present invention. The method comprises that: a transmitting source node NSource constructs a switch route exploring request packet and transmits it to a destination node NDestination; the switch route exploring request packet comprises information of switch route from the transmitting source node NSource to the destination node NDestination, wherein the information is known by the transmitting source node NSource; and the destination node NDestination constructs a switch route exploring response packet and transmits it to the transmitting source node NSource.

17 Claims, 4 Drawing Sheets

(56) References Cited

U.S. PATENT DOCUMENTS

| | | | |
|---|---|---|---|
| 2008/0310340 A1* | 12/2008 | Isozu | 370/328 |
| 2008/0316997 A1* | 12/2008 | Zeng et al. | 370/351 |
| 2009/0052321 A1* | 2/2009 | Kamath | 370/235 |

FOREIGN PATENT DOCUMENTS

| | | |
|---|---|---|
| CN | 101375171 A | 2/2009 |
| CN | 101854306 A | 10/2010 |
| EP | 1475926 A2 | 11/2004 |

OTHER PUBLICATIONS

IEEE Std 802.3™—2008, "IEEE Standard for Information technology—Telecommunications and information exchange between systems—Local and metropolitan area networks—Specific Requirements," IEEE Computer Society, New York, NY, Dec. 26, 2008.

IEEE Std 802.1AE™—2006, "IEEE Standard for Local and metropolitan area networks, Media Access Control (MAC) Security," IEEE Computer Society, New York, NY, Aug. 18, 2006.

\* cited by examiner

SWITCH ROUTE EXPLORING METHOD, SYSTEM AND DEVICE

This application is a National Stage application of international application PCT/CN2011/070246 filed on Jan. 14, 2011, which claimed the priority of Chinese patent application No.201010195725.2 filed on Jun. 7, 2010. Both the international application and the Chinese patent application are incorporated herein by reference in their entireties.

FIELD OF THE INVENTION

The present invention relates to the field of network security, and in particular to a switching route discovery method, a system and a device thereof.

BACKGROUND OF THE INVENTION

A wired Local Area Network (LAN) is generally a broadcasting network, hence data transmitted from one node can be received by any other node. All nodes of the network share a channel, which may cause significant security risks on the network. Any attacker accessing the network is able to capture all the data packets on the network and steal key information by simply listening.

In the prior art, a LAN in accordance with the national specification GB/T 15629.3 (corresponding to IEEE 802.3 or ISO/IEC 8802-3) is not provided with a method to maintain the confidentiality of data; in order to protect the Ethernet, IEEE 802.1AE provides a data encryption protocol, specifically, a hop-by-hop encryption measure to realize secure data transmission between network nodes. However, this hop-by-hop encryption measure causes a huge computational load to the switching devices in the LAN and may induce attacks by attackers to the switching devices; moreover, the delay of transmitting a data packet from the transmitting node to the destination node is increased, and transmission efficiency of the network is degraded.

A wired LAN has a complex topological structure and involves a large number of nodes, therefore, data communication in the network is also complex. In order to select a secure communication method flexibly according to the network topology between two data communication parties in a LAN, it is desired to provide a mechanism to obtain the network topology between the data communication parties.

SUMMARY OF THE INVENTION

An object of the embodiments of the present invention is to provide a switching route discovery method, a system and a device thereof, which enable a node to acquire the information of the first switching device and the last switching device that a data packet from a transmitting source node to a destination node travels.

Technical solutions of the embodiments of the present invention include;

A switching route discovery method, including:

forming a switching route discovery request packet and transmitting the switching route discovery request packet to a destination node $N_{Source}$ by a transmitting source node $N_{Source}$, the switching route discovery request packet including inter-node switching route information from the transmitting source node $N_{Source}$ to the destination node $N_{Destination}$ that is known to the transmitting source node $N_{Source}$;

forming a switching route discovery response packet and transmitting the switching route discovery response packet to the transmitting source node $N_{Source}$ by the destination node $N_{Destination}$.

A switching route discovery system, including: a transmitting source node $N_{Source}$, a first switching device SW-first, a last switching device SW-last and a destination node $N_{Destination}$, wherein the transmitting source node $N_{Source}$ is adapted to form a switching route discovery request packet, transmit the switching route discovery request packet to the destination node $N_{Destination}$, and receive a switching route discovery response packet from the destination node $N_{Destination}$;

the first switching device SW-first and the last switching device SW-last are adapted to modify and then forward the switching route discovery request packet from the transmitting source node $N_{Source}$ to the destination node $N_{Destination}$, and extract 4-tuple identifier information from the switching route discovery response packet from the destination node $N_{Destination}$ to the transmitting source node $N_{Source}$, store the 4-tuple identifier information, and then forward the switching route discovery response packet;

the destination node $N_{Destination}$ is adapted to receive the switching route discovery request packet from the transmitting source node $N_{Source}$, extract and store the 4-tuple identifier information, and then transmit the switching route discovery response packet to the transmitting source node $N_{Source}$.

A terminal device, the terminal device including:

a switching route discovery request unit, adapted to, when the terminal device is a transmitting source node, transmit a switching route discovery request packet to a destination node, wherein the switching route discovery request packet includes 4-tuple identifier information that is known to the terminal device, and the 4-tuple identifier includes $ID_{Source}$, $ID_{SW-first}$, $ID_{SW-last}$ and $ID_{Destination}$, where $ID_{Source}$ represents an identifier of the transmitting source node; $ID_{SW-first}$ represents an identifier of a first switching device that a data packet from the transmitting source node to the destination node travels; $ID_{SW-last}$ represents an identifier of a last switching device that a data packet from the transmitting source node to the destination node travels; and $ID_{Destination}$ represents an identifier of the destination node;

a switching route discovery receiving unit, adapted to, when the terminal device is the transmitting source node, receive a switching route discovery response packet transmitted from the destination node after the switching route discovery request unit transmits the switching route discovery request packet to the destination node, and extract the 4-tuple identifier information from the packet, which is to be used as switching route information between the terminal device and the destination node.

A switching device, including:

a first switching route update unit, adapted to, when the switching device is a first switching device that a data packet from a transmitting source node to a destination node travels, update an $ID_{SW-first}$ field in a 4-tuple identifier of a switching route discovery request packet with an identifier of the switching device on receipt of the switching route discovery request packet transmitted from the transmitting source node to the destination node, and then forward the switching route discovery request packet, wherein the switching route discovery request packet includes 4-tuple identifier information that is known to the switching device, and the 4-tuple identifier includes $ID_{Source}$, $ID_{SW-first}$, $ID_{SW-last}$ and $ID_{Destination}$, where $ID_{Source}$ represents an identifier of the transmitting source node; $ID_{Destination}$ represents an identifier of the destination node; the $ID_{SW-first}$ field represents an identifier of the first switching device that a data packet from the transmitting source node to the destination node travels; and the $ID_{SW-last}$ field represents an identifier of a last switching device that a data packet from the transmitting source node to the destination node travels;

a second switching route update unit, adapted to, when the switching device is the last switching device that a data packet from the transmitting source node to the destination node travels, update the $ID_{SW\text{-}last}$ field in the 4-tuple identifier of the switching route discovery request packet with an identifier of the switching device on receipt of the switching route discovery request packet transmitted from the transmitting source node to the destination node, and then forward the switching route discovery request packet.

The switching route discovery method, system and device according to the embodiments of the present invention enable the transmitting source node $N_{Source}$ and the destination node $N_{Destination}$ to obtain the information of the first switching device and the last switching device that a communication data packet between them travels, and allow the first switching device and the last switching device from the transmitting source node to the destination node to acknowledge their special places on the link between the transmitting source node and the destination node. Therefore, in subsequence secure communication, a suitable secure communication mechanism can be selected flexibly by using the obtained switching route information.

DETAILED DESCRIPTION OF THE INVENTION

A switching route discovery method according to an embodiment of the present invention enables a node to acquire the information of the first switching device and the last switching device that a data packet from a transmitting source node to a destination node travels.

Figure 1:
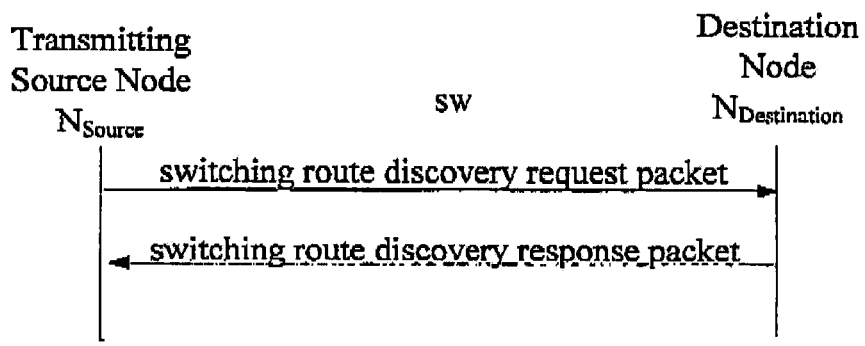
FIG. 1 is a schematic diagram of a switching route discovery protocol packet according to an embodiment of the present invention.

Referring to FIG. 1, the switching route discovery method provided by the embodiment of the present invention mainly includes the following two steps:

1) a transmitting source node $N_{Source}$ forms a switching route discovery request packet and transmits the switching route discovery request packet to a destination node $N_{Destination}$;

2) the destination node $N_{Destination}$ forms a switching route discovery response packet and transmits the switching route discovery response packet to the transmitting source node $N_{Source}$.

Preferably, in the embodiment of the present invention, a 4-tuple identifier may be defined as inter-node switching route information from the transmitting source node $N_{Source}$ to the destination node $N_{Destination}$:

[$ID_{Source}$, $ID_{SW\text{-}first}$, $ID_{SW\text{-}last}$, $ID_{Destination}$]

where $ID_{Source}$ represents an identifier of the transmitting source node $N_{Source}$;

$Id_{SW\text{-}first}$ represents an identifier of a first switching device that a data packet from the transmitting source node $N_{Source}$ to the destination node $N_{Destination}$ travels;

$ID_{SW\text{-}last}$ represents an identifier of a last switching device that a data packet from the transmitting source node $N_{Source}$ to the destination node $N_{Destination}$ travels; and $ID_{Destination}$ represents an identifier of the destination node $N_{Destination}$.

It should be noted that the embodiment of the present invention does not limits the order of the elements in the 4-tuple identifier.

Either or both of the transmitting source node $N_{Source}$ and the destination node $N_{Destination}$ can be user terminals or switching devices. $ID_{SW\text{-}first}$ is also $ID_{Source}$ when the transmitting source node $N_{Source}$ is a switching device. $ID_{SW\text{-}last}$ is also $ID_{Destination}$ when the destination node $N_{Destination}$ is a switching device. In some cases, the first switching device SW-first and the last switching device SW-last on the route from the transmitting source node $N_{Source}$ to the destination node $N_{Destination}$ may be the same switching device, i.e., $ID_{SW\text{-}first}$ and $ID_{SW\text{-}last}$ in the 4-tuple identifier may be the same.

Preferably, according to the embodiment of the present invention, a switching device that can receive the data packet between the transmitting source node $N_{Source}$ and the destination node $N_{Destination}$ but does not appear in the switching route information 4-tuple identifier is defined to be an intermediate switching device. Data from the transmitting source node $N_{Source}$ to the destination node $N_{Destination}$ might not go through any intermediate switching device or may go through multiple intermediate switching devices.

In a network, in order to acquire switching route information from a transmitting source node $N_{Source}$ to a destination node $N_{Destination}$, a switching route discovery process is initiated.

Figure 2:
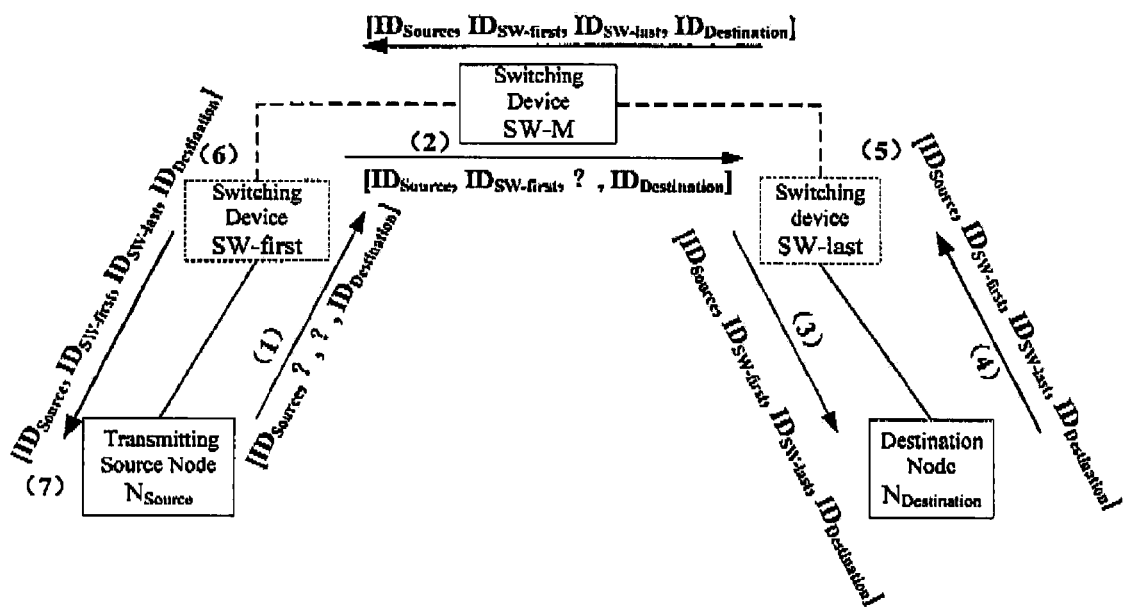
FIG. 2 is a flowchart of a switching route discovery protocol according to an embodiment of the present invention.

Specifically, a switching route discovery process is shown in FIG. 2, and the transmitting source node $N_{Source}$ forming the switching route discovery request packet and transmitting the switching route discovery request packet to the destination node $N_{Destination}$ in the above step 1) may include:

1.1) the transmitting source node $N_{Source}$ forms the switching route discovery request packet and transmits the switching route discovery request packet to the destination node $N_{Destination}$, and the packet mainly includes a 4-tuple identifier [$ID_{Source}$, $ID_{SW\text{-}last}$, $ID_{Destination}$], where $ID_{Source}$: its value is an identifier of the transmitting source node $N_{Source}$;

$ID_{SW\text{-}first}$: its value is $ID_{Source}$ when the transmitting source node $N_{Source}$ is a switching device; its value is unknown when the transmitting source node $N_{Source}$ is a user terminal;

$ID_{SW\text{-}last}$: its value is $ID_{Destination}$ when the destination node $N_{Destination}$ is a switching device; its value is unknown when the destination node $N_{Destination}$ is a user terminal;

$ID_{Destination}$: its value is an identifier of the destination node $N_{Destination}$.

1.2) on receipt of the switching route discovery request packet, a switching device SW-first finds that the $ID_{SW\text{-}first}$ field in the 4-tuple identifier is unknown and that the transmitting source node $N_{Source}$ is its neighboring node, fills the $ID_{SW\text{-}first}$ field in the 4-tuple identifier with its own identifier information, and then forwards the switching route discovery request packet.

1.3) the intermediate switching device SW-M directly forwards the switching route discovery request packet.

1.4) on receipt of the switching route discovery request packet, the switching device SW-last finds that the $ID_{SW\text{-}last}$ field in the 4-tuple identifier is unknown and that the destination node $N_{Destination}$ identified in $ID_{Destination}$ is its neighboring node, fills the $ID_{SW\text{-}last}$ field in the 4-tuple identifier with its own identifier information, and then forwards the switching route discovery request packet.

Preferably, according to a specific implementation of the above step 1), on receipt of the switching route discovery request packet, each of the switching devices may firstly determine whether itself is SW-first: whether me $ID_{SW\text{-}first}$ field is unknown and whether the transmitting source node $N_{Source}$ is its neighboring node, and if so, the switching device fills the $ID_{SW\text{-}first}$ field in the 4-tuple identifier with its own identifier information; then the switching device may determine whether itself is SW-last: whether the $ID_{SW\text{-}last}$ field is unknown and whether the destination node $N_{Destination}$ is its neighboring node, and if so, the switching device may fill the $ID_{SW\text{-}last}$ field in the 4-tuple identifier with its own identifier information. If the switching device is neither SW-first nor SW-last, it is an intermediate switching device. In some cases, SW-first and SW-last may be the same switching device.

Specifically, the destination node $N_{Destination}$ forming the switching route discovery response packet and transmitting the switching route discovery response packet to the transmitting source node $N_{Source}$ in the above step 2) may include:

2.1) on receipt of the switch rout discovery request packet, the destination node $N_{Destination}$ records 4-tuple identifier information [$ID_{Source}$, $ID_{SW\text{-}first}$, $ID_{SW\text{-}last}$, $ID_{Destination}$] of the switching route discovery request packet, encapsulates the 4-tuple identifier into the switching route discovery response packet, and transmits the switching route discovery response packet to the transmitting source node $N_{Source}$.

2.2) on receipt of the switching route discovery response packet, the switching device SW-last finds that itself is in the 4-tuple identifier, records the 4-tuple identifier information, and then forwards the switching route discovery response packet.

2.3) the intermediate switching device SW-M directly forwards the switching route discovery response packet.

2.4) on receipt of the switching route discovery response packet, the switching device SW-first finds that itself is in the 4-tuple identifier, records the 4-tuple identifier information, and then forwards the switching route discovery response packet.

2.5) on receipt of the switching route discovery response packet, the transmitting source node $N_{Source}$ records the 4-tuple identifier information, which concludes the switching route discovery process.

Preferably, according to a specific implementation of the above step 2), on receipt of the switching route discovery response packet, each of the switching devices may firstly determine whether itself is in the 4-tuple identifier, and if so, records the 4-tuple identifier information; otherwise, directly forwards the switching route discovery response packet.

In the whole network, only the transmitting source node $N_{Source}$, the first switching device SW-first, the last switching device SW-last and the destination node $N_{Destination}$ have to record the switching route information from the transmitting source node $N_{Source}$ to the destination node $N_{Destination}$. If the transmitting source node $N_{Source}$ is a switching device, then the first switching device SW-first that a data packet from the transmitting source node $N_{Source}$ to the destination node $N_{Destination}$ travels is $N_{Source}$ itself, i.e., SW-first is $N_{Source}$. If the destination node $N_{Destination}$ is a switching device, then the last switching device SW-last that a data packet from the transmitting source node $N_{Source}$ to the destination node $N_{Destination}$ travels is $N_{Destination}$ itself, i.e., SW-last is $N_{Destination}$.

In a specific implementation, the transmitting source node $N_{Source}$ may put some identifier information in the switching route discovery request packet while forming the packet. The identifier information may be clock, a sequence number or a random number, to identify the freshness of the current switching route discovery. Correspondingly, the destination node $N_{Destination}$ may put the same identifier information in the switching route discovery response packet while forming the packet On receipt of a switching route discovery response packet, the transmitting source node $N_{Source}$ has to check whether the identifier information in the packet is consistent with the identifier information in a previously-transmitted switching route discovery request packet.

In a specific implementation, in order to prevent switching route information between the transmitting source node $N_{source}$ and the destination node $N_{Destination}$ from being leaked, the 4-tuple identifier in the switching route discovery request packet and the switching route discovery response packet between the transmitting source node and the destination node maybe transmitted in a hop-by-hop encryption manner.

Figure 3:
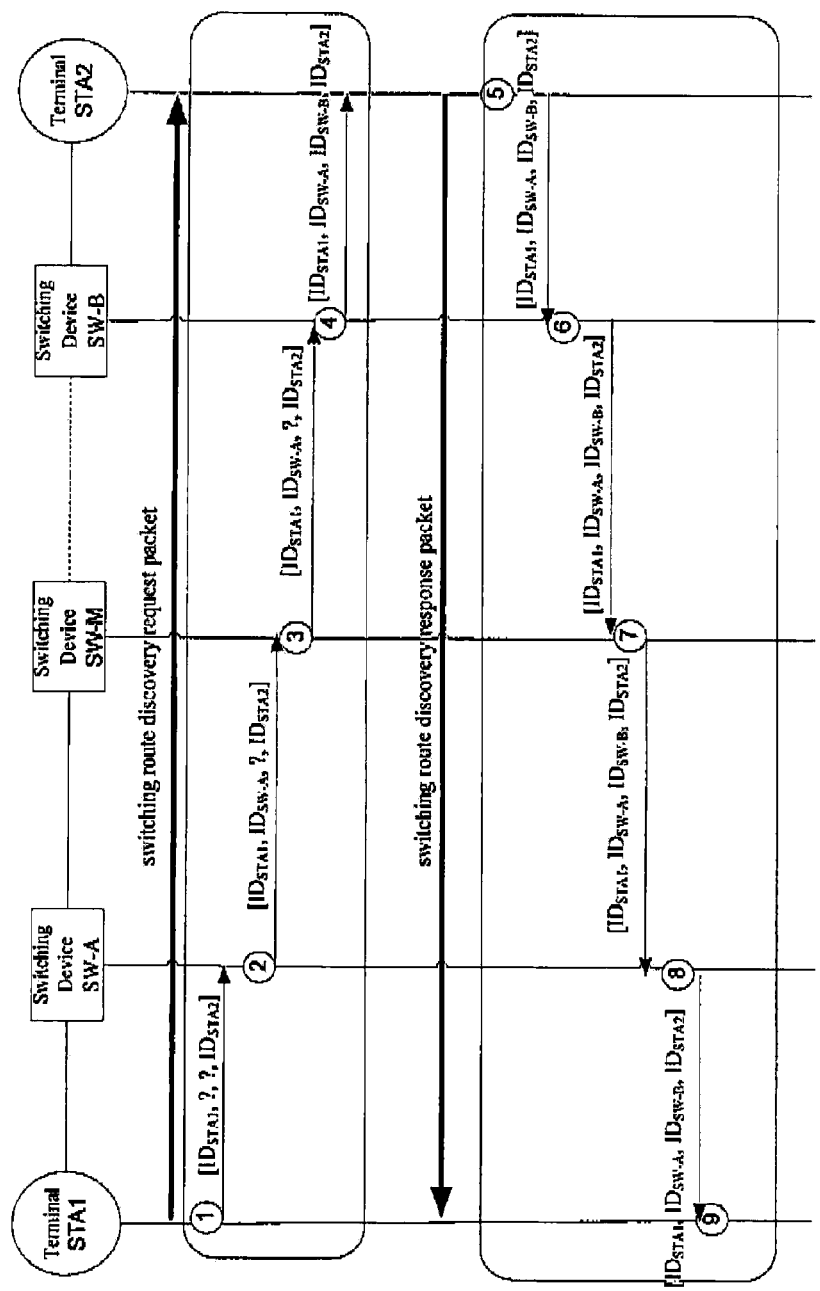
FIG. 3 is a flowchart of a switching route discovery message from a user terminal to a user terminal according to a first embodiment of the present invention.

FIG. 3 is a flowchart of a switching route discovery message from a user terminal STA1 to a user terminal STA2 according to Embodiment 1 of the present invention, where the switching device SW-A is a neighboring node of STA1, the switching device SW-B is a neighboring node of STA2, the first node that a data packet from STA1 to STA2 travels is STA1, while the last node is STA2, and SW-M is an intermediate switching device. The whole process of switching route discovery involves two packets, i.e., a switching route discovery request packet and a switching route discovery response packet.

The process of transmitting the switching route discovery request packet from STA1 to STA2 is described below:

STA1 forms the switching route discovery request packet, the 4-tuple identifier being [$ID_{STA1}$, ?, ?, $ID_{STA2}$];

SW-A modifies the switching route discovery request packet, the resulting 4-tuple identifier being [$ID_{STA1}$, $ID_{SW\text{-}A}$, ?, $ID_{STA2}$], and then forwards the switching route discovery request packet;

SW-M directly forwards the switching route discovery request packet;

SW-B modifies the switching route discovery request packet, the resulting 4-tuple identifier being [$ID_{STA1}$, $ID_{SW\text{-}A}$, $ID_{SW\text{-}B}$, $ID_{STA2}$], and then forwards the switching route discovery request packet;

STA2 receives the switching route discovery request packet, stores the 4-tuple identifier information, and forms the switching route discovery response packet.

The process of transmitting the switching route discovery response packet from STA2 to STA1 is described below:

after receiving the switching route discovery request packet and storing the 4-tuple identifier information, STA2 encapsulates the obtained 4-tuple identifier information into the switching route discovery response packet, and transmits the switching route discovery response packet to STA1;

SW-B records the 4-tuple identifier information in the switching route discovery response packet, and then forwards the switching route discovery response packet;

SW-M directly forwards the switching route discovery response packet;

SW-A records the 4-tuple identifier information in the switching route discovery response packet, and then forwards the switching route discovery response packet;

STA1 receives the switching route discovery response packet, and records the 4-tuple identifier information in the switching route discovery response packet.

Figure 4:
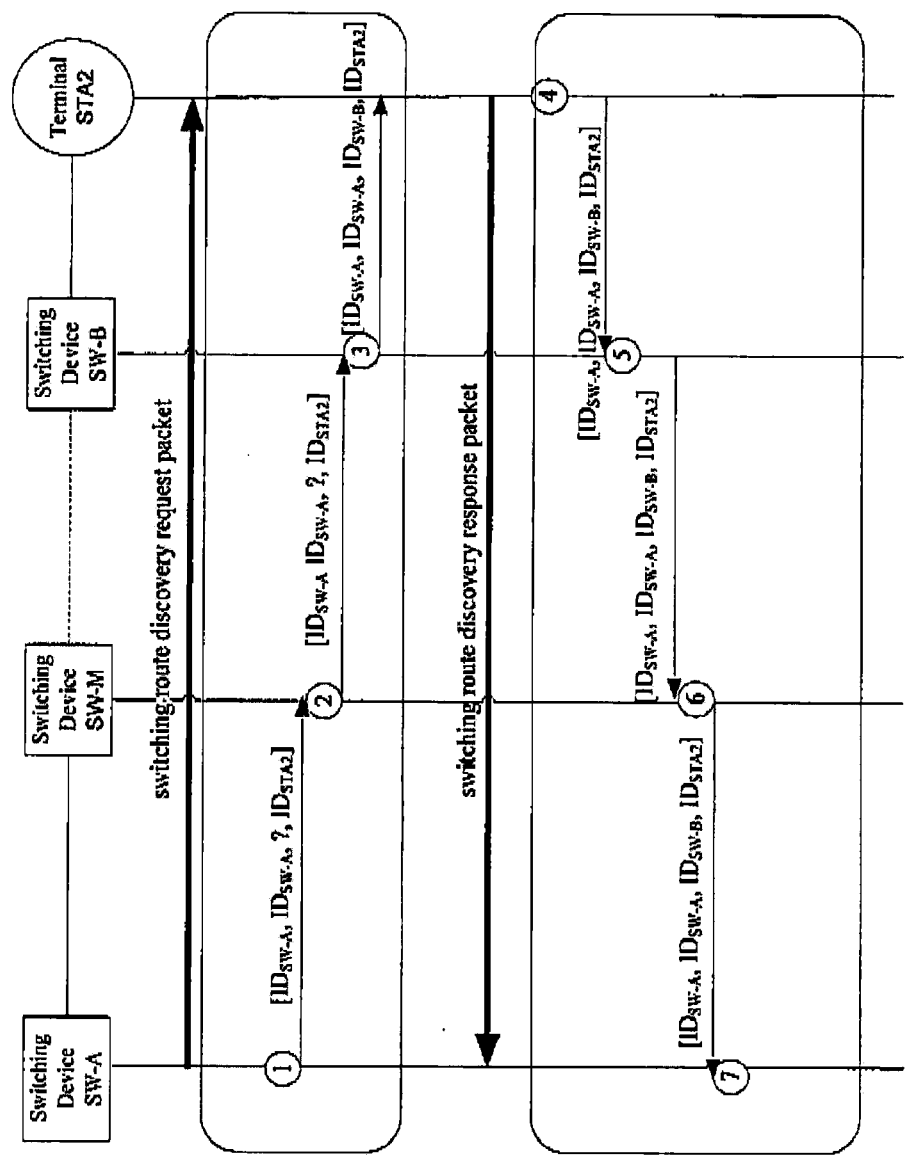
FIG. 4 is a flowchart of a switching route discovery message from a switching device to a user terminal according to a second embodiment of the present invention.

FIG. 4 is a flowchart of a switching route discovery message from a switching device SW-A to a user terminal STA2 according to Embodiment 2 of the present invention. The whole process involves two packets, i.e., a switching route discovery request packet and a switching route discovery response packet.

The process of transmitting the switching route discovery request packet from SW-A to STA2 is described below:

SW-A forms tine switching route discovery request packet, the 4-tuple identifier being [$ID_{SW-A}$, $ID_{SW-A}$, ?, $ID_{STA2}$];

SW-M directly forwards the switching route discovery request packet;

SW-B modifies the switching route discovery request packet, the resulting 4-tuple identifier being [$ID_{SW-A}$, $ID_{SW-A}$, $ID_{SW-B}$, $ID_{STA2}$], and then forwards the switching route discovery request packet;

STA2 receives the switching route discovery request packet, stores the 4-tuple identifier information, and forms the switching route discovery response packet.

The process of transmitting the switching route discovery response packet from STA2 to SW-A is described below:

after receiving the switching route discovery request packet and storing the 4-tuple identifier information, STA2 encapsulates the obtained 4-tuple identifier information into the switching route discovery response packet, and transmits the switching route discovery response packet to SW-A;

SW-B records the 4-tuple identifier information in the switching route discovery response packet and then forwards the switching route discovery response packet;

SW-M directly forwards the switching route discovery response packet;

SW-A records the 4-tuple identifier information in the switching route discovery response packet.

Figure 5:
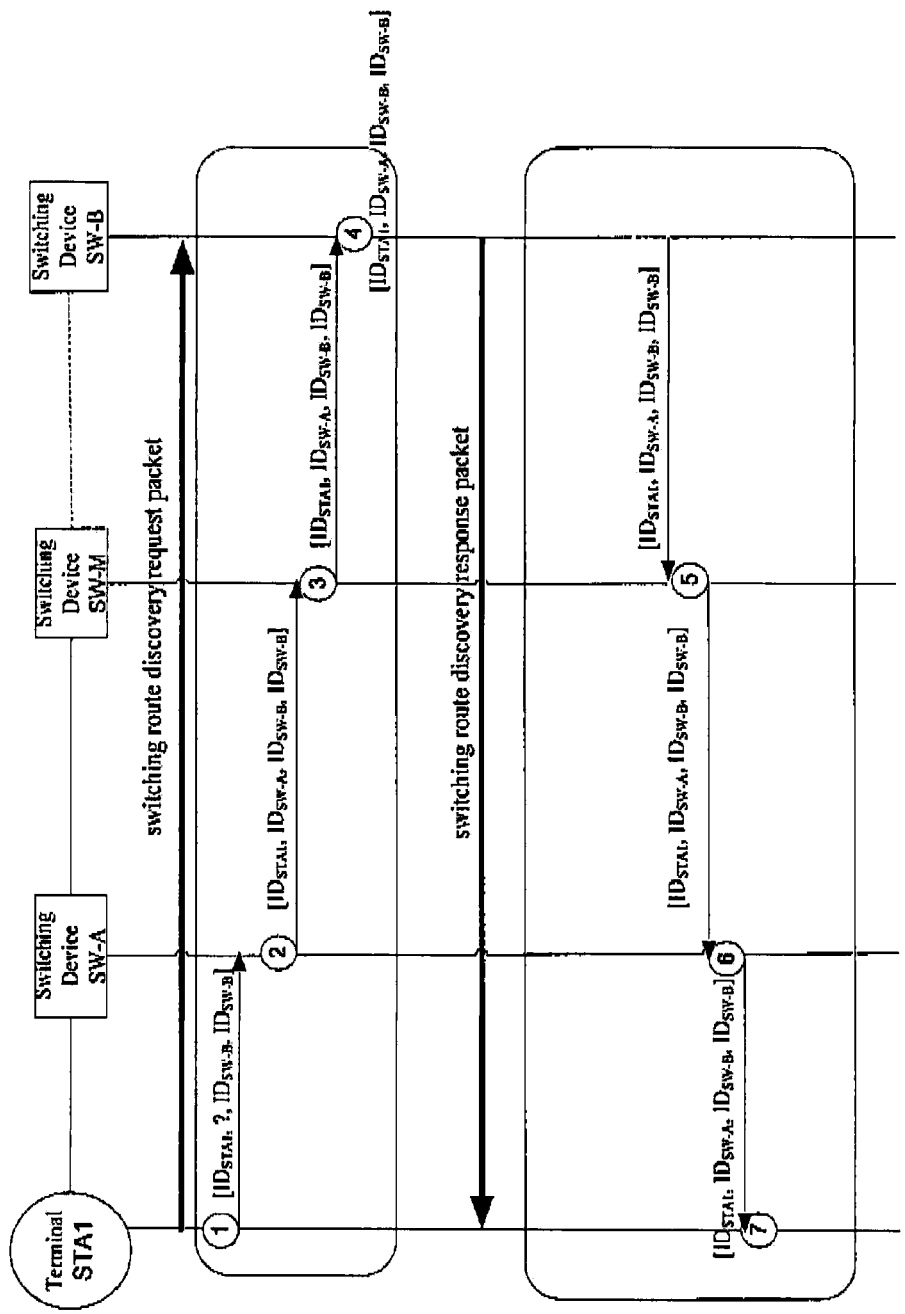
FIG. 5 is a flowchart of a switching route discovery message from a user terminal to a switching device according to a third embodiment of the present invention.

FIG. 5 is a flowchart of a switching route discovery message from a user terminal STA1 to a switching device SW-B according to Embodiment 3 of the present invention. The whole process involves two packets, i.e., a switching route discovery request packet and a switching route discovery response packet.

The process of transmitting the switching route discovery request packet from STA1 to SW-B is described below:

STA1 forms the switching route discovery request packet, the 4-tuple identifier being [$ID_{STA1}$, ?, $ID_{SW-B}$, $ID_{SW-B}$];

SW-A modifies the switching route discovery request packet, the resulting 4-tuple identifier being [$ID_{STA1}$, $ID_{SW-A}$, $ID_{SW-B}$, $ID_{SW-B}$], and then forwards the switching route discovery request packet;

SW-M directly forwards the switching route discovery request packet;

SW-B stores the 4-tuple identifier information and forms the switching route discovery response packet.

The process of transmitting the switching route discovery response packet from SW-B to STA1 is described below:

SW-B encapsulates the obtained 4-tuple identifier information into the switching route discovery response packet and transmits the switching route discovery response packet to STA1;

SW-M directly forwards the switching route discovery response packet;

SW-A records the 4-tuple identifier information in the switching route discovery response packet, and then forwards the switching route discovery response packet;

STA1 receives the switching route discovery response packet, and records the 4-tuple identifier information in the switching route discovery response packet, A switching route discovery system is also provided by an embodiment of the present invention, and the switching route discovery system includes: a transmitting source node $N_{Source}$ a first switching device SW-first, a last switching device SW-last and a destination node $N_{Destination}$. The transmitting source node $N_{Source}$ is adapted to form a switching route discovery request packet, transmit the switching route discovery request packet to the destination node $N_{Destination}$, and receive a switching route discovery response packet from the destination node $N_{Destination}$. The first switching device SW-first and the last switching device SW-last are adapted to modify and then forward the switching route discovery request packet from the transmitting source node $N_{Source}$ to the destination node $N_{Destination}$, extract 4-tuple identifier information from the switching route discovery response packet from the destination node $N_{Destination}$ to the transmitting source node $N_{Source}$ store the 4-tuple identifier information and then forward the switching route discovery response packet. The destination node $N_{Destination}$ receives the switching route discovery request packet from the transmitting source node $N_{Source}$, extracts and stores the 4-tuple identifier information, and then transmits the switching route discovery response packet to the transmitting source node $N_{Source}$.

The switching route discovery system may further include: an intermediate switching device SW-M, the intermediate switching device SW-M being a switching device that can receive a communication data packet between the transmitting source node $N_{Source}$ and the destination node $N_{Destination}$ but does not appear in the 4-tuple identifier. The intermediate device SW-M directly forwards the switching route discovery request packet and the switching route discovery response packet between the transmitting source node $N_{Source}$ and the destination node $N_{Destination}$.

The invention claimed is:

1. A switching route discovery method, comprising:

forming a switching route discovery request packet and transmitting the switching route discovery request packet to a destination node $N_{Destination}$ by a transmitting source node $N_{Source}$, the switching route discovery request packet comprising inter-node switching route information from the transmitting source node $N_{Source}$ to the destination node $N_{Destination}$ that is known to the transmitting source node $N_{source}$, wherein the inter-node switching route information from the transmitting source node $N_{Source}$ to the destination node $N_{Destination}$ is a 4-tuple identifier:

[$ID_{Source}$, $ID_{SW-first}$, $ID_{SW-last}$, $ID_{Destination}$]

where $ID_{Source}$ represents an identifier of the transmitting source node $N_{Source}$;

$ID_{SW-first}$ represents an identifier of a first switching device that a data packet from the transmitting source node $N_{Source}$ to the destination node $N_{Destination}$ travels;

$ID_{SW-last}$ represents an identifier of a last switching device that a data packet from the transmitting source node $N_{Source}$ to the destination node $N_{Destination}$ travels; and $ID_{Destination}$ represents an identifier of the destination node $N_{Destination}$;

forming a switching route discovery response packet and transmitting the switching route discovery response packet to the transmitting source node $N_{Source}$ by the destination node $N_{Destination}$;

wherein forming the switching route discovery request packet and transmitting the switching route discover request packet to the destination node $N_{Destination}$ by the transmitting source node $N_{Source}$, the switching route discovery request packet comprising a 4-tuple identifier: [$ID_{Source}$, $ID_{SW-first}$, $ID_{SW-last}$, $ID_{Destination}$];

where $ID_{Source}$: represents an identifier of the transmitting source node $N_{Source}$;

$ID_{SW-first}$: is $ID_{Source}$ when the transmitting source node $N_{Source}$ is a switching device; and is unknown when the transmitting source node $N_{Source}$ is a user terminal;

$ID_{SW-last}$: is $ID_{Destination}$ when the destination node $N_{Destination}$ is a switching device;

and is unknown when the destination node $N_{Destination}$ is a user terminal; and $ID_{Destination}$: represents an identifier of the destination node $N_{Destination}$;

recording, by the destination node $N_{Destination}$, the 4-tuple identifier [$ID_{Source}$, $ID_{SW-first}$, $ID_{SW-last}$, $ID_{Destination}$] in the switching route discovery request packet on receipt of the switch route discovery request packet, encapsulating the 4-tuple identifier into the switching route discovery response packet, and transmitting the switching route discovery response packet to the transmitting source node $N_{Source}$; and recording, by the transmitting source node $N_{Source}$, the 4-tuple identifier on receipt of the switching route discovery response packet, which concludes the process of switching route discovery.

2. The switching route discovery method according to claim 1, wherein the transmitting source node $N_{Source}$ forming the switching route discovery request packet and transmitting the switching route discovery request packet to the destination node $N_{Destination}$ comprises:

filling by the first switching device SW-first the $ID_{SW-first}$ field in the 4-tuple identifier with its own identifier information on receipt of the switching route discovery request packet if the $ID_{SW-first}$ field in the 4-tuple identifier is unknown and if the transmitting source node $N_{Source}$ is its neighboring node, and then forwarding by the first switching device SW-first the switching route discovery request packet; and filling by the last switching device SW-last the $ID_{SW-last}$ field in the 4-tuple identifier with its own identifier information on receipt of the switching route discovery request packet if the $ID_{SW-last}$ field in the 4-tuple identifier is unknown and if the destination node $N_{Destination}$ identified in the $ID_{Destination}$ is its is it neighboring node, and then forwarding by the last switching device SW-last the switching route discovery request packet.

3. The switching route discovery method according to claim 2, further comprising:

in the case where there is an intermediate switching device between the first switching device SW-first and the last switching device SW-last, directly forwarding by the intermediate switching device the switching route discovery request packet.

4. The switching route discovery method according to claim 3, further comprising:

determining by each switching device on receipt of the switching route discovery request packet whether itself is the first switching device SW-first: whether the $ID_{SW-first}$ field is unknown and whether the transmitting source node $N_{Source}$ is its neighboring node, and if so, filling the $ID_{SW-first}$ field in the 4-tuple identifier with its own identifier information;

determining by the switching device whether itself is the last switching device SW-last: whether the $ID_{SW-last}$ field is unknown and whether the destination node $N_{Destination}$ is its neighboring node, and if so, filling the $ID_{SW-last}$ field in the 4-tuple identifier with its own identifier information, then forwarding the switching route discovery request packet;

determining by the switching device itself as an intermediate device if it is neither the first switching device SW-first nor the last switching device SW-last, and directly forwarding the switching route discovery request packet.

5. The switching route discovery method according to claim 4, wherein the destination node $N_{Destination}$ forming the switching route discovery response packet and transmitting the switching route discovery response packet to the transmitting source node $N_{Source}$ comprises:

recording by the destination node $N_{Destination}$ the 4-tuple identifier information [$ID_{Source}$, $ID_{SW-first}$, $ID_{SW-last}$, $ID_{Destination}$] in the switching route discovery request packet on receipt of the switch rout discovery request packet, encapsulating the 4-tuple identifier into the switching route discovery response packet, and transmitting the switching route discovery response packet to the transmitting source node $N_{Source}$;

finding by the last switching device SW-last that itself is in the 4-tuple identifier on receipt of the switching route discovery response packet, recording the 4-tuple identifier information, and then forwarding the switching route discovery response packet;

finding by the first switching device SW-first that itself is in the 4-tuple identifier on receipt of the switching route discovery response packet, recording the 4-tuple identifier information, and then forwarding the switching route discovery response packet; and recording, by the transmitting source node $N_{Source}$, the 4-tuple identifier information on receipt of the switching route discovery response packet, which concludes the process of switching route discovery.

6. The switching route discovery method according to claim 5, further comprising:

in the case where there is an intermediate device between the first switching device SW-first and the last switching device SW-last, directly forwarding by the intermediate switching device the switching route discovery response packet.

7. The switching route discovery method according to claim 2, further comprising:

determining by each switching device on receipt of the switching route discovery request packet whether itself is the first switching device SW-first: whether the $ID_{SW-first}$ field is unknown and whether the transmitting source node $N_{Source}$ is its neighboring node, and if so, filling the $ID_{SW-first}$ field in the 4-tuple identifier with its own identifier information;

determining by the switching device whether itself is the last switching device SW-last: whether the $ID_{SW-last}$ field is unknown and whether the destination node $N_{Destination}$ is its neighboring node, and if so, filling the $ID_{SW-last}$ field in the 4-tuple identifier with its own identifier information, then forwarding the switching route discovery request packet;

determining by the switching device itself as an intermediate device if it is neither the first switching device SW-first nor the last switching device SW-last, and directly forwarding the switching route discovery request packet.

8. The switching route discovery method according to claim 7, wherein the destination node $N_{Destination}$ forming the switching route discovery response packet and transmitting the switching route discovery response packet to the transmitting source node $N_{Source}$ comprises:

finding by the last switching device SW-last that itself is in the 4-tuple identifier on receipt of the switching route discovery response packet, recording the 4-tuple identifier information, and then forwarding the switching route discovery response packet; and finding by the first switching device SW-first that itself is in the 4-tuple identifier on receipt of the switching route discovery response packet, recording the 4-tuple identifier information, and then forwarding the switching route discovery response packet.

9. The switching route discovery method according to claim 8, further comprising:

in the case where there is an intermediate device between the first switching device SW-first and the last switching device SW-last, directly forwarding by the intermediate switching device the switching route discovery response packet.

10. The switching route discovery method according to claim 1, wherein the switching route discovery request packet further comprises identifier information for identifying freshness of the switching route discovery; correspondingly, the destination node $N_{Destination}$ puts the same identifier information into the switching route discovery response packet while forming the switching route discovery response packet; and the transmitting source node $N_{Source}$ determines whether the identifier information in the switching route discovery response packet is consistent with the identifier information in the previously-transmitted switching route discovery request packet on receipt of the switching route discovery response packet.

11. The switching route discovery method according to claim 1, wherein the 4-tuple identifier in the switching route discovery request packet and the switching route discovery response packet between the transmitting source node and the destination node is transmitted in a hop-by-hop encryption manner.

12. A terminal device, the terminal device comprising:

a switching route discovery request unit, comprising a first transmitter adapted to, when the terminal device is a transmitting source node, transmit a switching route discovery request packet to a destination node, wherein the switching route discovery request packet comprises 4-tuple identifier information that is known to the terminal device, and the 4-tuple identifier comprises $ID_{source}$, $ID_{SW-first}$, $ID_{SW-last}$ and $ID_{Destination}$, where $ID_{Source}$ represents an identifier of the transmitting source node; $ID_{SW-first}$ represents an identifier of a first switching device that a data packet from the transmitting source node to the destination node travels; $ID_{SW-last}$ represents an identifier of a last switching device that a data packet from the transmitting source node to the destination node travels; and $ID_{Destination}$ represents an identifier of the destination node;

wherein the terminal device transmits the switching route discovery request packet to the destination node $N_{Destination}$ the switching route discover request packet comprising a 4-tuple identifier: [$ID_{Source}$, $ID_{SW-first}$, $ID_{SW-last}$, $ID_{Destination}$];

where $ID_{Source}$: represents an identifier of the transmitting source node $N_{Source}$;

$ID_{SW-first}$: is $ID_{Source}$ when the transmitting source node $N_{Source}$ is a switching device; and is unknown when the transmitting source node $N_{Source}$ is a user terminal;

$ID_{SW-last}$: $ID_{Destination}$ when the destination node $N_{Destination}$ is a switching device;

and is unknown when the destination node $N_{Destination}$ is a user terminal; and $ID_{Destination}$: represents an identifier of the destination node $N_{Destination}$; and a switching route discovery receiving unit, comprising a first receiver adapted to, when the terminal device is the transmitting source node, receive a switching route discovery response packet transmitted from the destination node after the switching route discovery request unit transmits the switching route discovery request packet to the destination node, and extract the 4-tuple identifier [$ID_{Source}$, $ID_{SW-first}$, $ID_{SW-last}$ $ID_{Destinationl}$] from the switching route discovery response packet, which is the same to all the nodes of the path from the destination node to the transmitting source node and is to be used as switching route information between the terminal device and the destination node, wherein the transmitting source node further records the 4-tuple identifier on receipt of the switching route discovery response packet, which concludes the process of switching route discovery.

13. The terminal device according to claim 12, comprising:

a switching route discovery response unit, comprising a second receiver adapted to, when the terminal device is the destination node, receive the switching route discovery request packet transmitted from the transmitting source node, extract the 4-tuple identifier information from the switching route discovery request packet, which is to be used as the switching route information between the terminal device and the transmitting source node, form the switching route discovery response packet and transmit the switching route discovery response packet to the transmitting source node so as to notify the transmitting source node of the 4-tuple identifier information using the switching route discovery response packet.

14. A switching device, comprising:

a first switching route update unit, comprising a processor adapted to, when the switching device is a first switching device that a data packet from a transmitting source node to a destination node travels, update an $ID_{SW-first}$ field in a 4-tuple identifier of a switching route discovery request packet with an identifier of the switching device on receipt of the switching route discovery request packet transmitted from the transmitting source node to the destination node, and then forward the switching route discovery request packet, wherein the switching route discovery request packet comprises 4-tuple identifier information that is known to the switching device, and the 4-tuple identifier comprises $ID_{Source}$, $ID_{SW-first}$, $ID_{SW-last}$ and $ID_{Destination}$ where $ID_{Source}$ represents an identifier of the transmitting source node; $ID_{Destination}$ represents an identifier of the destination node; the $ID_{SW\text{-}first}$ field represents an identifier of the first switching device that a data packet from the transmitting source node to the destination node travels, is $ID_{Source}$ when the transmitting source node $N_{Source}$ is a switching device, and is unknown when the transmitting source node $N_{Source}$ is a user terminal; and the $ID_{SW\text{-}last}$ field represents an identifier of a last switching device that a data packet from the transmitting source node to the destination node travels;

the first switching route update unit being further adapted to record the 4-tuple identifier of a switching route discovery response packet and then forward on receipt of the switching route discovery response packet transmitted from the destination node to the transmitting source node; and the 4-tuple identifier [$ID_{Source}$, $ID_{SW\text{-}first}$, $ID_{SW\text{-}last}$, $ID_{Destination}$] being the same to all thenodes of the path from the destination node to the transmitting source node;

a second switching route update unit, comprising a processor adapted to, when the switching device is the last switching device that a data packet from the transmitting source node to the destination node travels, update the $ID_{SW\text{-}last}$ field in the 4-tuple identifier of the switching route discovery request packet with an identifier of the switching device on receipt of the switching route discovery request packet transmitted from the transmitting source node to the destination node, its value being $ID_{Destination}$ when the destination node $N_{Destination}$ is a switching device, and its value is unknown when the destination node $N_{Destination}$ is a user terminal, and then forward the switching route discovery request packet;

the second switching route update unit being further adapted to record the 4-tuple identifier of the switching route discovery response packet and then forward on receipt of the switching route discovery response packet transmitted from the destination node to the transmitting source node; and the 4-tuple identifier [$ID_{Source}$, $ID_{SW\text{-}last}$, $ID_{SW\text{-}last}$, $ID_{Destination}$] being the same to all the nodes of the path from the destination node to the transmitting source node.

15. The switching device according to claim 14, further comprising:
a switching route discovery request unit, comprising a second transmitter adapted to, when the switching device is the transmitting source node, transmit the switching route discovery request packet to the destination node;
a switching route discovery receiving unit, comprising a third receiver adapted to, when the switching device is the transmitting source node, receive the switching route discovery response packet transmitted from the destination node after the switching route discovery request unit transmits the switching route discovery request packet to the destination node, and extract the 4-tuple identifier information from the switching route discovery response packet, which is to be used as switching route information between the switching route discovery switching device and the destination node.

16. The switching device according to claim 15, the switching device further comprises:
a switching route discovery response unit, comprising a fifth receiver adapted to, when the switching device is the destination node, receive the switching route discovery request packet transmitted from the transmitting source node, extract the 4-tuple identifier information from the switching route discovery request packet, which is to be used as the switching route information between the switching device and the transmitting source node, form the switching route discovery response packet and transmit the switching route discovery response packet to the transmitting source node so as to notify the transmitting source node of the 4-tuple identifier information using the switching route discovery response packet.

17. The switching device according to claim 14, the switching device further comprises:
a switching route discovery response unit, comprising a fourth receiver adapted to, when the switching device is the destination node, receive the switching route discovery request packet transmitted from the transmitting source node, extract the 4-tuple identifier information from the switching route discovery request packet, which is to be used as the switching route information between the switching device and the transmitting source node, form the switching route discovery response packet and transmit the switching route discovery response packet to the transmitting source node so as to notify the transmitting source node of the 4-tuple identifier information using the switching route discovery response packet.

* * * * *